(12) United States Patent
De Mattia et al.

(10) Patent No.: US 9,381,578 B2
(45) Date of Patent: Jul. 5, 2016

(54) METHOD FOR MACHINING A THROUGH-HOLE IN A COMPONENT AND MACHINING DEVICE FOR IMPLEMENTING THE SAID METHOD

(71) Applicant: Airbus Operations SAS, Toulouse (FR)

(72) Inventors: Denis De Mattia, Basse Goulaine (FR); Gilles Batard, Rouans (FR)

(73) Assignee: Airbus Operations SAS (FR)

( * ) Notice: Subject to any disclaimer, the term of this patent is extended or adjusted under 35 U.S.C. 154(b) by 340 days.

(21) Appl. No.: 14/178,468

(22) Filed: Feb. 12, 2014

(65) Prior Publication Data

US 2014/0227055 A1    Aug. 14, 2014

(30) Foreign Application Priority Data

Feb. 13, 2013  (FR) ...................................... 13 51219

(51) Int. Cl.
*B23C 3/02* (2006.01)
*B23B 39/16* (2006.01)

(52) U.S. Cl.
CPC . *B23B 39/16* (2013.01); *B23C 3/02* (2013.01); *B23C 2215/04* (2013.01); *B23C 2220/52* (2013.01); *B23C 2226/27* (2013.01); *Y10T 408/03* (2015.01); *Y10T 408/65* (2015.01); *Y10T 409/303808* (2015.01); *Y10T 409/307616* (2015.01)

(58) Field of Classification Search
CPC ........... Y10T 409/303752; Y10T 409/303808; Y10T 409/30756; Y10T 409/307616; B23C 3/02; B23C 2220/52; B23C 2215/04; B23C 2226/27; B23Q 1/54; B23Q 3/12; B23Q 5/046; B23Q 27/00

USPC ................................ 409/131, 132, 199, 200
See application file for complete search history.

(56) References Cited

U.S. PATENT DOCUMENTS

| | | | | |
|---|---|---|---|---|
| 3,803,981 A | * | 4/1974 | Allgeyer | B23Q 1/0018 408/124 |
| 4,573,840 A | * | 3/1986 | Skrentner | B23C 3/02 409/171 |
| 5,197,836 A | * | 3/1993 | Crivellin | B23Q 1/5481 409/200 |

(Continued)

FOREIGN PATENT DOCUMENTS

| | | |
|---|---|---|
| DE | 10 2010 053474 A1 | 5/2012 |
| EP | 1 103 341 A1 | 5/2001 |

(Continued)

*Primary Examiner* — Daniel Howell
(74) *Attorney, Agent, or Firm* — Lerner, David, Littenberg, Krumholz & Mentlik, LLP

(57) ABSTRACT

A method for machining a through-hole in a wall of a component, includes setting in rotation on itself a cutting tool about a rotation axis and setting the rotation axis of the tool in rotation about a first orbital rotation axis parallel to, and eccentric by an eccentricity E with respect to, the rotation axis of the tool. The method further includes setting the first orbital rotation axis in rotation, over at least one revolution, about a second orbital rotation axis parallel to, and eccentric by an amount f with respect to, the first orbital rotation axis, the eccentricity being fixed. This configuration makes it possible to balance the elements located between the rotation axis of the tool and the first orbital rotation axis, so that the rotation axis can thus be set in rotation about the first orbital rotation axis at high rotational speeds that contribute toward increasing productivity.

13 Claims, 3 Drawing Sheets

(56) References Cited

U.S. PATENT DOCUMENTS

| | | | |
|---|---|---|---|
| 6,533,508 B1 * | 3/2003 | Nonaka | B23C 3/04 409/132 |
| 6,840,722 B1 * | 1/2005 | Nonaka | B23Q 1/5468 29/898.042 |
| 8,152,421 B2 * | 4/2012 | Yagishita | B23C 3/02 409/132 |
| 2012/0294689 A1 * | 11/2012 | Yagista | B23B 51/0036 409/200 |

FOREIGN PATENT DOCUMENTS

| | | | |
|---|---|---|---|
| JP | 03073261 A | * | 3/1991 |
| JP | 2009166204 A | * | 7/2009 |

* cited by examiner

METHOD FOR MACHINING A THROUGH-HOLE IN A COMPONENT AND MACHINING DEVICE FOR IMPLEMENTING THE SAID METHOD

The present invention relates to a method for machining a through-hole in a component and to a machining device used for implementing it, the machining method being more particularly suited to components made of composite material.

BACKGROUND OF THE INVENTION

In the aeronautical field, many aircraft components are made of composite material in order to reduce the onboard mass and thereby the energy consumption of the aircraft. By way of example, the orbital frames of the fuselage, the stringers and the fuselage panels may be made of composite material.

Some of these composite components need to be machined in order to create, amongst other things, through-holes which are used notably for joining the components together.

A first approach, illustrated in FIG. 1, might be to make a through-hole 10 in a component 12 by drilling, using a drill bit 14 secured to a tool holder 16 which pivots about a rotation axis 18 with respect to a machine tool 20. With this approach, the axis 22 of the drill bit 14 coincides with the axis of rotation 18 and machining is the result of the combination of a rotational movement of the drill bit 14 about its axis 22 and of a tool feed movement of the drill bit advancing in a direction parallel to the axis 22.

During drilling, as long as the central point 24 of the end of the drill bit 14 has not come through, the drill bit 14 exerts on the component 12 axial loads (along the axis 22) that are high because the speed of the central point 24 in a plane perpendicular to the axis 22 is zero. These axial loads cancel as soon as the central point 24 comes through.

When the drilling is being done in a thin wall of the component 12 which may deform elastically because of the axial loads, it is necessary to provide a tool 26 of the sheet clamp type in order to ensure the transfer of the axial loads and limit the deformations of the component. This tool 26 comes into contact, as close as possible to the edge of the through-hole 10, with the surface 28 of the component 12 that is on the opposite side to the surface 30 via which the drill bit 14 enters.

During drilling, this tool 26:
makes it possible to prevent the deformation of the component in bending in a way likely to cause the hole to be geometrically non-compliant,
makes it possible to prevent component spring-back as the drill bit comes through, which spring-back is likely to cause delaminating and flaking around the edge of the hole in the case of a composite material.

The use of a tool 26 of the sheet clamp type is not entirely satisfactory because the movements of the parts located on each side of the component need to be coordinated and these parts need to be positioned correctly relative to one another, all of which tends to make tool movement management more complicated.

For certain components, given their geometries, it may prove to be impossible to position a tool on the opposite surface 28 to the surface 30 via which the drill bit 14 enters.

Another approach, illustrated in FIG. 2, might be to create a through-hole 10' in a component 12' using the orbital drilling technique.

In that case, a shell end-mill milling cutter 32 is used, this being secured to an electric spindle 34 which rotates the milling cutter 32 about a first rotation axis 36. The electric spindle 34 is secured to a machine tool 38 which rotates it about a second rotation axis 40. The first rotation axis 36 is parallel to and eccentric with respect to the second rotation axis 40. Thus, the diameter of the through-hole 10' is dependent on the diameter of the milling cutter 32 and on the eccentricity E between the two rotation axes 36 and 40.

With this approach, the electric spindle 34 rotates the milling cutter 32 at the high rotational speeds used in High-Speed Machining HSM. The machine tool 38 performs the tool feed movement in the direction of the axis 40 and the orbital movement of the first rotation axis 36.

This second approach does not require the use of a tool of the sheet clamp type, because the axial loadings are lower because there is no point on the end of the milling cutter that has zero speed in a plane perpendicular to the axis 36.

However, this second approach is not entirely satisfactory because of its low productivity.

This is because the eccentricity between the two axes 36 and 40 needs to be adjustable so that the diameter of the through-hole can be adjusted, and because of this, the electric spindle 34 cannot be balanced. As a result, its rotational speed about the second rotation axis needs to be low (200 rpm at most) in order to limit the onset of vibration phenomena.

BRIEF SUMMARY OF THE INVENTION

Hence, the present invention seeks to overcome the disadvantages of the prior art.

To this end, one aspect of the invention is a method for machining a through-hole in a wall of a component, involving:
setting a cutting tool in rotation on itself about a rotation axis,
setting said rotation axis of the tool in rotation about a first orbital rotation axis parallel to, and eccentric by an eccentricity E with respect to, the rotation axis of the tool,
characterized in that the method involves:
setting the first orbital rotation axis in rotation, over at least one revolution, about a second orbital rotation axis parallel to, and eccentric by an amount f with respect to, the first orbital rotation axis,
using a first intermediate support that allows the cutting tool a rotational movement about its rotation axis and a second intermediate support that allows the said first intermediate support a rotational movement about the first orbital rotation axis, the eccentricity E between the rotation axis of the tool and the first orbital rotation axis being fixed and the first intermediate support being statically and/or dynamically balanced.

This configuration makes it possible to balance the elements provided between the rotation axis of the tool and the first orbital rotation axis and thus to set in rotation the said rotation axis about the first orbital rotation axis at high rotational speeds contributing to increasing productivity.

For preference, the method involves making a pilot hole then setting the first orbital rotation axis in rotation, over at least one revolution, about the second orbital rotation axis. This feature allows the life of the cutting tool to be extended.

In an alternative form, the method involves setting the first orbital rotation axis in rotation about the second orbital rotation axis either before making the hole or after a pilot hole has been created, just before withdrawing the cutting tool from the hole. This feature is more particularly suited to the creation of a hole of significant depth exceeding the length of the cutting edge or edges of the tool.

Advantageously, the rotational speed of the cutting tool about its rotation axis is greater than or equal to forty times the rotational speed of the first intermediate support about the first orbital rotation axis, and/or the rotational speed of the first intermediate support about the first orbital rotation axis is greater than or equal to forty times the rotational speed of the second intermediate support about the second orbital rotation axis. This feature makes it possible to improve the surface finish of the hole.

With one approach, setting the second intermediate support in rotation about the second orbital rotation axis involves coordinated translation movements along two mutually perpendicular axes which are perpendicular to the direction of the rotation axis of the tool. If this is being used with a machine tool that comprises a spindle capable of moving with precision along two linear axes perpendicular to the axis of the spindle, then it is possible to cause the second orbital rotation axis to pivot by coordinating the translational movements of the said spindle in the two axes.

Advantageously, the method comprises a prior step involving determining the exact value of (E+r) where r is the radius of the cutting tool and E is the eccentricity between the rotation axis of the tool and the first orbital rotation axis. If this is being used with a numerical control machine tool, it is possible to incorporate this value (E+r) as a fixed parameter.

Another aspect of the invention is a device for implementing the method defined hereinabove.

BRIEF DESCRIPTION OF THE DRAWINGS

Other features and advantages will become apparent from the following description of the invention, which description is given solely as an example with reference to the attached drawings in which.

DETAILED DESCRIPTION

Figure 1:
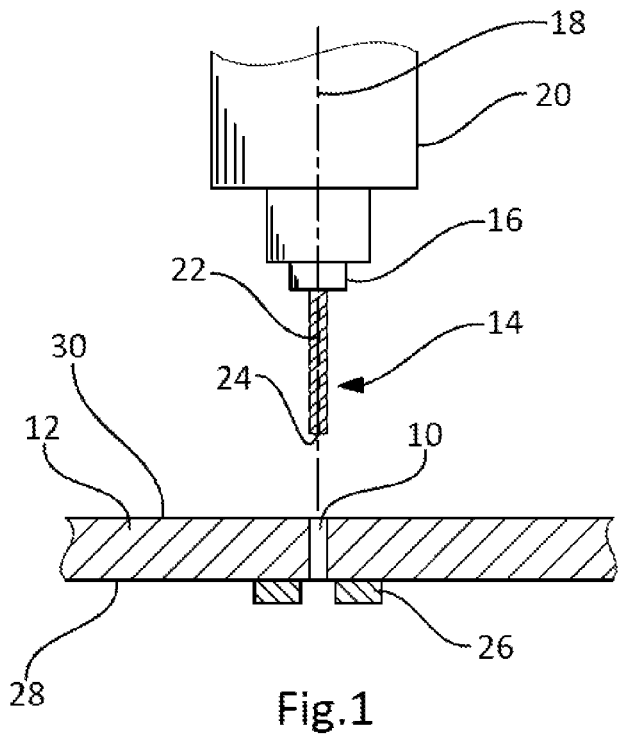
FIG. 1 is a diagram illustrating drilling with a drill bit according to the prior art.
Figure 2:
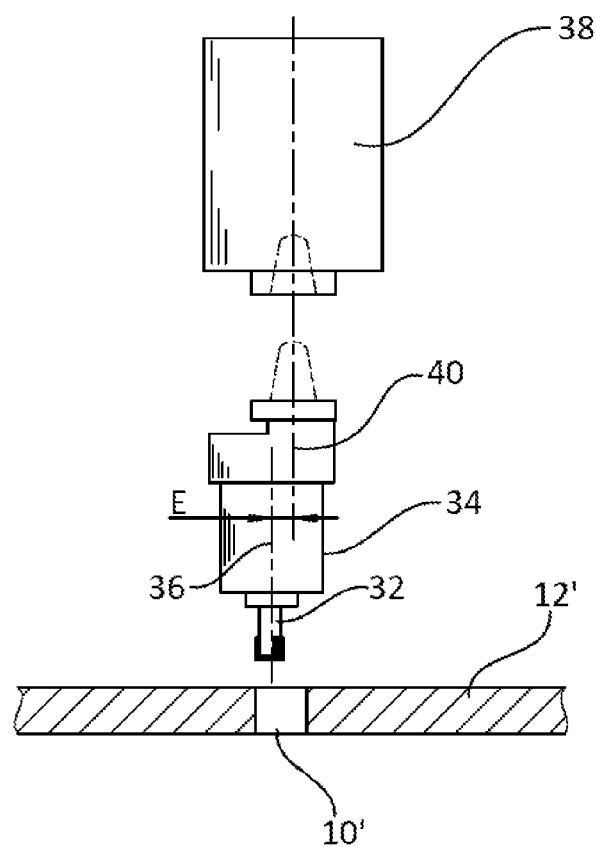
FIG. 2 is a diagram illustrating drilling of the orbital type according to the prior art.
Figure 3:
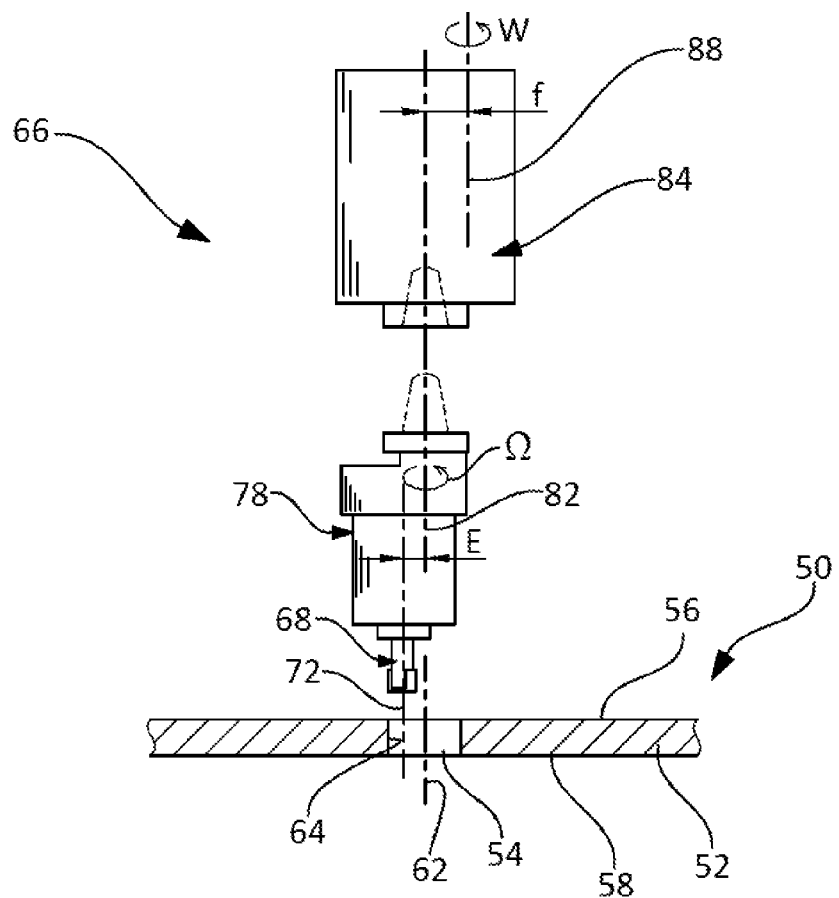
FIG. 3 is a diagram of a device for machining a through-hole which illustrates the invention.
Figure 5:
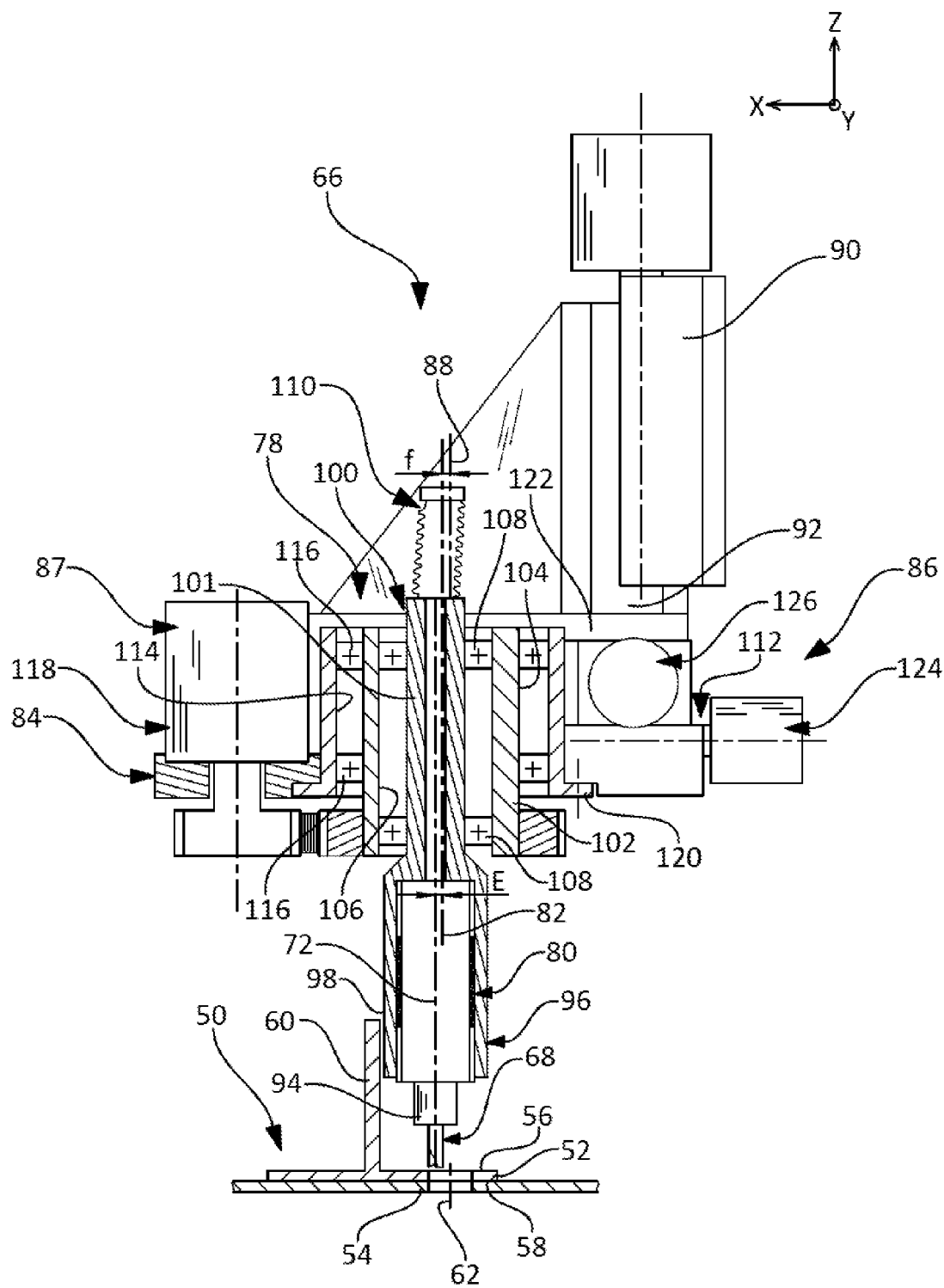
FIG. 5 is a vertical section through a machining device illustrating one embodiment of the invention.

FIGS. 3 and 5 depict a component 50 which comprises a wall 52 in which a hole 54 is to be made, the hole 54 being open at a first surface 56 and a second surface 58. The component 50 may comprise a stiffener 60 (visible in FIG. 5) which extends from the first surface 56 near the hole 54.

In one application, the component 50 is made of composite material and comprises for example a stack of laps of fibres embedded in a resin matrix. Of course, the invention is not restricted to this application and may be suitable for metal components or components made of some other material.

By way of example, the component 50 forms part of an aircraft, such as a fuselage frame, stringers, fuselage panels, for example.

The hole 54 is defined by an axis 62, generally perpendicular to the first surface 56, and by a surface of revolution 64 about the said axis 62 and which may be cylindrical. However, the invention is not restricted to this geometry. Thus, the hole may have a countersink in the part that opens onto the first surface 56.

In order to be able to machine it, the component 50 is immobilized on a support using any appropriate means. By way of example, it may be clamped to a framework or a machining table. The means for immobilizing the component 50 are not described further because these are known to those skilled in the art.

To make the hole 54, use is made of a machining device 66 which comprises a cutting tool 68 that interacts with the component 50.

Figure 4:
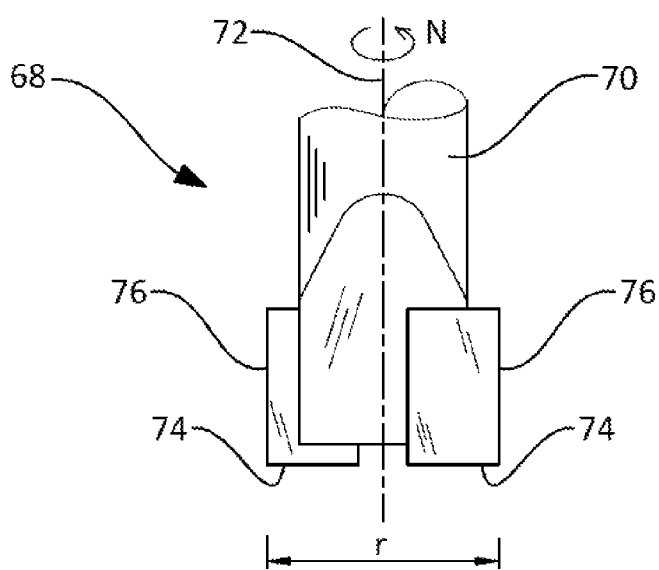
FIG. 4 is a side view of a shell end-mill milling cutter.

As illustrated in FIG. 4, the cutting tool 68 is a shell end-mill milling cutter 70 of radius r. As an idea of size, the radius r is of the order of a few millimetres.

The shell end-mill milling cutter 70 is not described further because it is known to those skilled in the art and may be identical to those used for orbital drilling.

The invention is not restricted to this type of cutting tool 68. In general, the cutting tool 68 comprises a rotation axis 72, at least one first cutting edge 74 which is parallel to or slightly inclined (by a few degrees) with respect to a plane perpendicular to the axis 72 and at least one second cutting edge 76 which is parallel to or slightly inclined (by a few degrees) with respect to the axis 72.

The machining device 66 comprises a first intermediate support 78 to which the cutting tool 68 is secured, the first intermediate support 78 allowing the said cutting tool 68 a rotational movement about its axis 72, and first means 80 for causing the cutting tool 68 to rotate about its axis 72. The rotational speed of the cutting tool 68 about its axis 72 is denoted N.

The first intermediate support 78 comprises a first orbital rotation axis 82 which is parallel to the axis 72 of the tool and eccentric with respect to the latter by a distance referred to as the eccentricity E. For the sake of legibility, E and r are not to scale with one another in FIGS. 3 and 5.

Unlike in the prior art, the eccentricity E cannot be adjusted by the operator. It has a value that is determined at its time of manufacture and that may vary from one intermediate support to another but which is fixed in use. According to an aspect of the invention, the eccentricity E is fixed for a given machining device. Thus, it is possible for the first intermediate support 78 to be perfectly statically and/or dynamically balanced. As a result, the first intermediate support 78 can be set in rotation about the first orbital rotation axis 82 at high rotational speeds, for example of the order of 1000 rpm, thus contributing to improving productivity.

To give an idea of sizes, E is equal to approximately 0.2 times r.

The machining device 66 also comprises a second intermediate support 84 to which the first intermediate support 78 is secured, the second intermediate support 84 allowing a rotational movement of the said first intermediate support 78 about the first orbital rotation axis 82, and second means 87 for causing the first intermediate support 78 to rotate about the first orbital rotation axis 82. The rotational speed of the first intermediate support 78 about the orbital rotation axis 82 is denoted Q.

According to one embodiment, the machining device comprises means to cause the cutting tool 68 to effect a translational movement in the direction of the rotation axis so as to make the hole 54. As an alternative, the component 50 could affect a translation movement in the direction of the rotation axis 72. In both instances, there is relative movement of the component 50 and of the cutting tool 68 one relative to the other and referred to as the tool feed movement in order to create the hole 54.

According to a feature of the invention, the machining device comprises means 86 for causing a rotational movement of the second intermediate support 84 about a second orbital rotation axis 88 parallel to the first orbital rotation axis 82 and eccentric with respect to the latter by a distance f. This second orbital rotation axis 88 coincides with the axis 62 of the hole 54 that is to be made. The distance f can be adjusted according to the hole that is made. In addition, it is independent of the eccentricity E. Thus, varying f does not change the eccentricity E.

Following adjustment, the value of the distance f is kept fixed for one revolution so as to obtain a hole with a circular periphery.

For the sake of legibility, E and f, and r and f are not to scale with one another in FIGS. 3 and 5. The rotational speed of the second intermediate support 84 about the second orbital rotation axis 88 is denoted W.

To give an idea of sizes, f has a value of the order of a few tenths of a millimetre.

According to an aspect of the invention, the radius R of the hole 54 is equal to r+E+f.

Thus, the method for machining a through-hole 54 in a component 50 involves:

i) setting the cutting tool 68 of radius r in rotation about its rotation axis 72, ii) setting said rotation axis 72 of the tool in rotation about the first orbital rotation axis 82 parallel to, and eccentric by an eccentricity E with respect to, the rotation axis 72 of the tool, iii) causing the tool 68 and the component 50 to move relative to one another in a direction parallel to the rotation axis 72 of the tool, iv) setting the first orbital rotation axis 82 in rotation, over at least one revolution, about a second orbital rotation axis 88 parallel to, and eccentric by an amount f with respect to, the first orbital rotation axis 82, v) withdrawing the cutting tool 68 from the through-hole 54.

As indicated earlier, the eccentricity E is fixed so that the first intermediate support 78 can be statically and/or dynamically balanced. In this way it is possible to impart to the first intermediate support 78 rotational speeds Q about the first orbital rotation axis 82 that are markedly higher than those of the prior art, and this contributes to significantly increasing productivity.

Steps i, ii and iii allow a pilot hole to be produced with a reduction in the risk of delamination. During these steps, the removal of material is performed generally by the first cutting edge(s) 74.

Step iv allows the hole 54 to be sized. During this step, the removal of material is performed by the second cutting edge(s) 76.

Thus, unlike in the prior art, wearing of the first cutting edge(s) 74 provided at the end of the cutting tool does not cause failure to comply with the dimensional tolerances on the hole 54. Thus, according to an aspect of the invention, each type of cutting edge is used optimally, the first cutting edge(s) 74 to address the problem of delamination and the second cutting edge(s) 76 to determine the geometry of the hole.

That leads to a significant lengthening of cutting tool life. Thus, the cutting tool 68 is declared "worn" when the first cutting edge(s) 74 cause delamination, i.e. about every 3000 holes, or when the second cutting edge(s) 76 cause a hole of poor geometry, namely around every 10 000 holes.

According to a first alternative form, step iv is triggered only when steps i, ii and iii have allowed the creation of a pilot through-hole. In such a case, step iv is performed only over one revolution or slightly more, in order to define the geometry of the hole 54.

In another alternative form, step iv is triggered right at the start of the drilling cycle before step iii is triggered. This alternative form is more particularly suited to holes 54 of significant depth, greater than the length of the second cutting edge(s) 76. Thus, there is no need to provide a cutting tool 68 with one or more second edge(s) 76 of a length greater than the depth of hole to be produced.

According to another alternative form, step iv is triggered at the end of the drilling cycle, after a pilot hole has been created and just before step v. In this case, the geometry of the hole is defined as the cutting tool is withdrawn. This alternative form is more particularly suited to holes 54 of significant depth, greater than the length of the second cutting edge(s) 76. Thus, there is no need to provide a cutting tool 68 with one or more second cutting edge(s) 76 of a length greater than the depth of hole to be produced.

In order to produce a hole, as the radius r is dictated by the geometry of the cutting tool 68 and the eccentricity E is fixed, the diameter of the hole R is determined by adjusting the value of the eccentricity f.

Before the hole 54 or a series of holes 54 is made, the machining method involves a prior step of determining the exact value of (E+r).

In a first alternative form, in order to determine the exact value of (E+r), a hole with f=0 is machined in a test piece then the diameter of the hole is measured. The exact value of (E+r) is equal to half of the measured diameter value.

In a second alternative form, in order to determine the exact value of (E+r), an optical technique such as a shadowgraph technique for example is used.

In the case of a numerical control machining device, knowing the exact value of (E+r) and the radius of the hole R, the machine can determine the value of f and therefore the path of the first orbital rotation axis 82.

Advantageously, the rotational speed N is markedly greater than the rotational speed Q which is itself markedly greater than the rotational speed W. This characteristic makes it possible to obtain a bore with a good surface finish.

For preference, the rotational speed N is greater than or equal to 40 times Q.

For preference, the rotational speed Q is greater than or equal to 40 times W.

Advantageously, the machining device 66 comprises a chassis 90, a third intermediate support 92 connected to the chassis 90 by a connection that allows a translational movement in a direction Z parallel to the axis 72 of rotation of the tool. The second intermediate support 84 is connected to the third intermediate support 92 by a connection that allows two translational movements along two axes X and Y which are mutually perpendicular and perpendicular to the direction of the rotation axis 72 of the tool. In this case, the rotation of the second intermediate support 84 about the second orbital rotation axis 88 is the result of the coordinated movements on the axes X and Y so as to cause the first orbital axis 82 to describe a circle of radius f at a rotational speed W.

According to a first embodiment illustrated in FIG. 5, the cutting tool 68 is mounted on a tool holder 94 which is itself mounted on an electric spindle 96. The tool holder 94 allows the cutting tool 68 to be coupled to the electric spindle 96 in a detachable way. This is not detailed because it is known to those skilled in the art.

The electric spindle 96 operates the means 80 to cause the rotational movement of the cutting tool 68 about its axis 72. According to one embodiment, the electric spindle 96 comprises a cylindrical body 98 which at a first end has first coupling means for attaching the tool holder 94 to the electric spindle and at a second end has second coupling means 100.

For preference, the cylindrical body 98 has a small diameter of the order of 25 mm, offset from the other elements of the machining device so that it can make holes 50 near a stiffener 60.

According to one embodiment, the first coupling means and the second coupling means are eccentric, as illustrated in FIG. 3.

According to one embodiment, the first coupling means and the second coupling means are coaxial, as illustrated in FIG. 5. This configuration allows the use of an electric spindle 96 which is perfectly dynamically and statically balanced.

According to one embodiment, the second coupling means comprise a shank 101 with a cylindrical land which extends from the second end of the cylindrical body 98 of the electrical spindle 96.

The machining device 66 also comprises an eccentric ring 102. This eccentric ring 102 comprises a cylindrical exterior wall 104 with an axis that corresponds to the first orbital rotation axis 82, and a bore 106 which has an axis coaxial with the rotation axis 72 of the tool parallel to and eccentric by an eccentricity E with respect to the axis of the exterior wall 104.

The coupling means 100 of the electric spindle 96 are pivot mounted in the bore 106 by rolling bearings 108 for example. To complement this, the electric spindle 96 comprises a rotation prevention system 110 so that it cannot pivot on itself and so as to impose a rotational movement on the cutting tool 68. According to one embodiment, the shank 101 of the electric spindle is connected by a torsionally rigid flexible tube to the chassis 90.

The assembly comprising the electric spindle 96 and the eccentric ring 102 forms the first intermediate support 78. This assembly is statically and dynamically balanced. In one approach, it is possible to balance the electric spindle 96 and the eccentric ring 102 separately. Thus, the electric spindle 96 is statically balanced by adding or removing material until its centre of gravity lies on the orbital rotation axis 82. The electric spindle 96 is dynamically balanced by making its main axis of inertia coincide with the orbital rotation axis 82, keeping the axial symmetry of masses as symmetric as possible. The same is done for the eccentric ring 102.

The machining device 66 also comprises a cross slide table 112. This table comprises a bore 114 in which the eccentric ring 102 is mounted such that it can pivot, for example using rolling bearings 116, and a drive 118 (which corresponds to the second means 87) for driving the rotation of the eccentric ring 102, for example via a pinion/belt/annulus assembly.

The cross slide table 112 comprises two parts 120 and 122 able to move relative to one another along two linear axes that are mutually perpendicular and perpendicular to the axes 72 and 82. A first drive 124 causes translational movement in the direction X and a second drive 126 causes translational movement in the direction Y. These two drives 124 and 126 cause the first orbital rotation axis 82 to rotate and describe a circle centred on the second orbital rotation axis 88 that coincides with the axis 62 of the hole with a radius f that is a function of the diameter of the hole 54 that is to be produced. By way of indication, the travels along the two axes X and Y are small, around 2 to 10 mm, and the drives 124 and 126 allow rotational speeds W of the order of 30 to 60 rpm to be achieved.

The first part 120 of the table 112 comprises the bore 114 and the drive 118. It corresponds to the second intermediate support 84.

The second part 122 of the table 112 corresponds to the third intermediate support 92.

In a first application, the machining device 66 corresponds to an effector which can be fixed to the end of an articulated arm. In this application, the machining device may comprise any means for encouraging precise positioning of the effector with respect to the surface 56 of the component 50 in a plane perpendicular to the axis of the hole 54 that is to be made and/or for precisely adjusting the angle of incidence between the axis 72 of the cutting tool 68 and the normal to the surface 56 of the component.

In another application, the machining device 66 may be fixed to a machine tool spindle. In that case, depending on the characteristics of the machine tool and notably on the precision of the movements of its spindle in a plane perpendicular to the axis of the spindle, the spindle could correspond to the third intermediate support 92.

In that case, the machine tool performs the tool feed movement in a direction parallel to the axis 72 of the cutting tool 68 and manages the translational movements along the axes X and Y so as to make the first orbital rotation axis 82 move in a circle of radius f.

The invention claimed is:

1. A method for machining a through-hole in a wall of a component, comprising:

setting in rotation on itself a cutting tool of radius r about a rotation axis, setting said rotation axis of the tool in rotation about a first orbital rotation axis parallel to, and eccentric by an eccentricity E with respect to, the rotation axis of the tool, making the cutting tool and the component effect a movement relative to one another so as to cause the cutting tool to interact with the component in such a way as to obtain a through-hole, withdrawing the cutting tool from the through-hole, wherein in setting the first orbital rotation axis in rotation, over at least one revolution, about a second orbital rotation axis parallel to, and eccentric by an amount f with respect to, the first orbital rotation axis, in using a first intermediate support that allows the cutting tool a rotational movement about its rotation axis and a second intermediate support that allows the first intermediate support a rotational movement about the first orbital rotational axis, the eccentricity (E) between the rotation axis of the tool and the first orbital rotation axis is fixed and the first intermediate support is at least one of statically and dynamically balanced.

2. The method for machining a through-hole according to claim 1, further comprising making a pilot hole then setting the first orbital rotation axis in rotation, over at least one revolution, about the second orbital rotation axis.

3. The method for machining a through-hole according to claim 1, further comprising setting the first orbital rotation axis in rotation about the second orbital rotation axis before causing the cutting tool and the component to move relative to one another to allow the cutting tool to interact with the component.

4. The method for machining a through-hole according to claim 1, further comprising setting the first orbital rotation axis in rotation about the second orbital rotation axis after a pilot hole has been created, just before withdrawing the cutting tool from the hole.

5. The method for machining a through-hole according to claim 1, wherein the rotational speed of the cutting tool about its rotation axis is greater than or equal to forty times the rotational speed of the first intermediate support about the first orbital rotation axis.

6. The method for machining a through-hole according to claim 1, wherein the rotational speed of the first intermediate support about the first orbital rotation axis is greater than or equal to forty times the rotational speed of the second intermediate support about the second orbital rotation axis.

7. The method for machining a through-hole according to claim 1, wherein the setting the second intermediate support in rotation about the second orbital rotation axis involves coordinated translation movements along two mutually perpendicular axes which are perpendicular to the direction of the rotation axis of the tool.

8. The method for machining a through-hole according to claim 1, further comprising a prior step involving determining the exact value of (E+r) where r is the radius of the cutting tool and E is the eccentricity between the rotation axis of the tool and the first orbital rotation axis.

9. A device for machining a through-hole, comprising:
a cutting tool of radius r with a rotation axis,
a first intermediate support to which the cutting tool is secured, allowing the cutting tool a rotational movement about its rotation axis,
first means for generating the rotational movement of the cutting tool about its rotation axis,
a second intermediate support to which the first intermediate support is secured allowing a rotational movement of the first intermediate support about a first orbital rotation axis parallel to, and eccentric by an eccentricity E with respect to, the rotation axis of the tool,
second means causing the rotational movement of the first intermediate support about the first orbital rotation axis,
means for causing the cutting tool and the component to move relative to one another, and
means for causing the second intermediate support to rotate about a second orbital rotation axis parallel to the first orbital rotation axis and eccentric therefrom by a distance f, the eccentricity E between the rotation axis of the tool and the first orbital rotation axis being fixed and the first intermediate support being at least one of statically and dynamically balanced.

10. The device according to claim 9, wherein the eccentricity E between the rotation axis of the tool and the first orbital rotation axis is equal to approximately 0.2 times the radius r of the cutting tool.

11. The device according to claim 9, wherein the second intermediate support is connected to a third intermediate support by a connection that allows two translational movements along two mutually perpendicular axes that are perpendicular to the direction of the rotation axis of the tool.

12. The device according to claim 9, wherein the first intermediate support comprises:
an electric spindle which at a first end has first coupling means for attaching the cutting tool and at a second end has coupling means,
an eccentric ring comprising an exterior wall that is cylindrical with an axis that corresponds to the first orbital rotation axis and a bore with an axis that is coaxial to the rotation axis of the tool, in which bore the second coupling means of the electric spindle are mounted such that they can pivot.

13. The device according to claim 12, wherein the electric spindle comprises a rotation-prevention system so that the electric spindle does not pivot on itself and cause the cutting tool to effect a rotational movement.

\* \* \* \* \*